United States Patent [19]

Judson

[11] Patent Number: 4,838,501
[45] Date of Patent: Jun. 13, 1989

[54] BALOPOD (HYBRID FLYING MACHINE)

[76] Inventor: Edward G. Judson, 1263 Union Ave., Newburgh, N.Y. 12550

[21] Appl. No.: 847,523

[22] Filed: Apr. 3, 1986

[51] Int. Cl.⁴ .................................. B64B 1; B64B 20; B64B 1/36; B64B 1/70
[52] U.S. Cl. ........................................ 244/29; 244/30; 244/95; 244/96
[58] Field of Search .................. 244/2, 5, 12.1, 12.5, 244/12.4, 25, 29, 30, 61, 93, 95, 96, 97, 98

[56] References Cited

U.S. PATENT DOCUMENTS

| | | | |
|---|---|---|---|
| 1,059,036 | 4/1913 | Coles | 244/61 |
| 1,790,923 | 2/1931 | Hodgdor | 244/5 |
| 1,818,104 | 8/1931 | Sperry | 244/93 |
| 1,821,061 | 9/1931 | Jenkins | 244/25 |
| 2,071,868 | 2/1937 | VonLude | 244/95 |
| 2,511,607 | 6/1950 | Turnquist | 244/25 |
| 2,926,869 | 3/1960 | Sullivan | 244/12.4 |
| 3,120,932 | 2/1964 | Stahmer | 244/25 |
| 3,897,032 | 7/1975 | Papst | 244/61 |

FOREIGN PATENT DOCUMENTS

| | | | |
|---|---|---|---|
| 185661 | 9/1922 | United Kingdom | 244/5 |
| 1117054 | 6/1968 | United Kingdom | 244/30 |

*Primary Examiner*—Galen Barefoot

[57] ABSTRACT

A flying machine (L.T.A.-H.T.A. Hybrid) connected through the fuselage . . . using a two-point-lift system wherein the lifts are static and dynamic . . . separately and simultaneously. The static lift is supplied by an aerostat (#36) while the dynamic lift is supplied by an atmospheric deflector (#48) . . . This system, by the clever use of 180 degrees pivotable pusher (blower) engine (#1), being and becoming capable of:
1. S. T. O. L. and/or V.T.O.L.
2. Rearward Flight A two-point-lift system, as stated in the preferred embodiment (technical description), employing L. T. A. and H. T. A. method (separately and simultaneously) to be allowed development on a non-exclusive basis (excluding Balopod). The process levels the device by coordinating static lift, thrust, and dynamic lift.

1 Claim, 5 Drawing Sheets

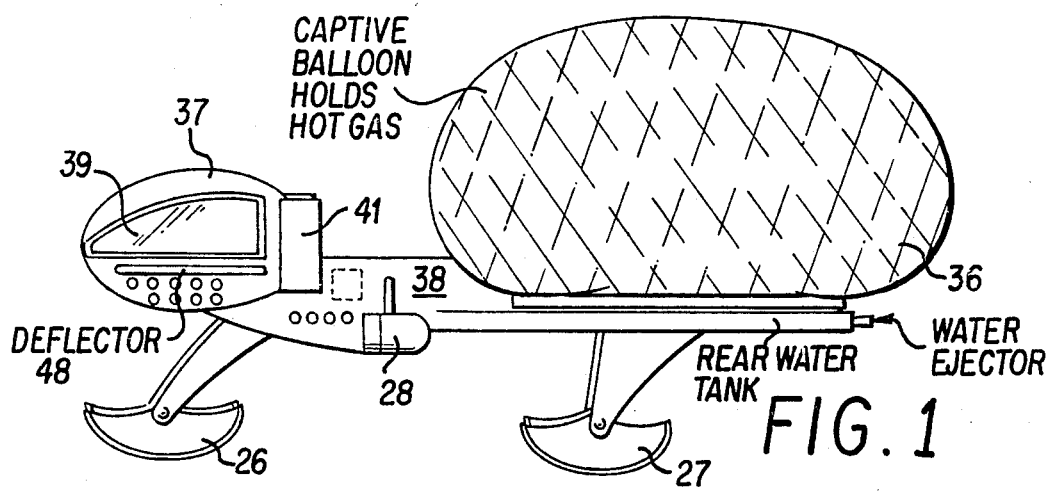
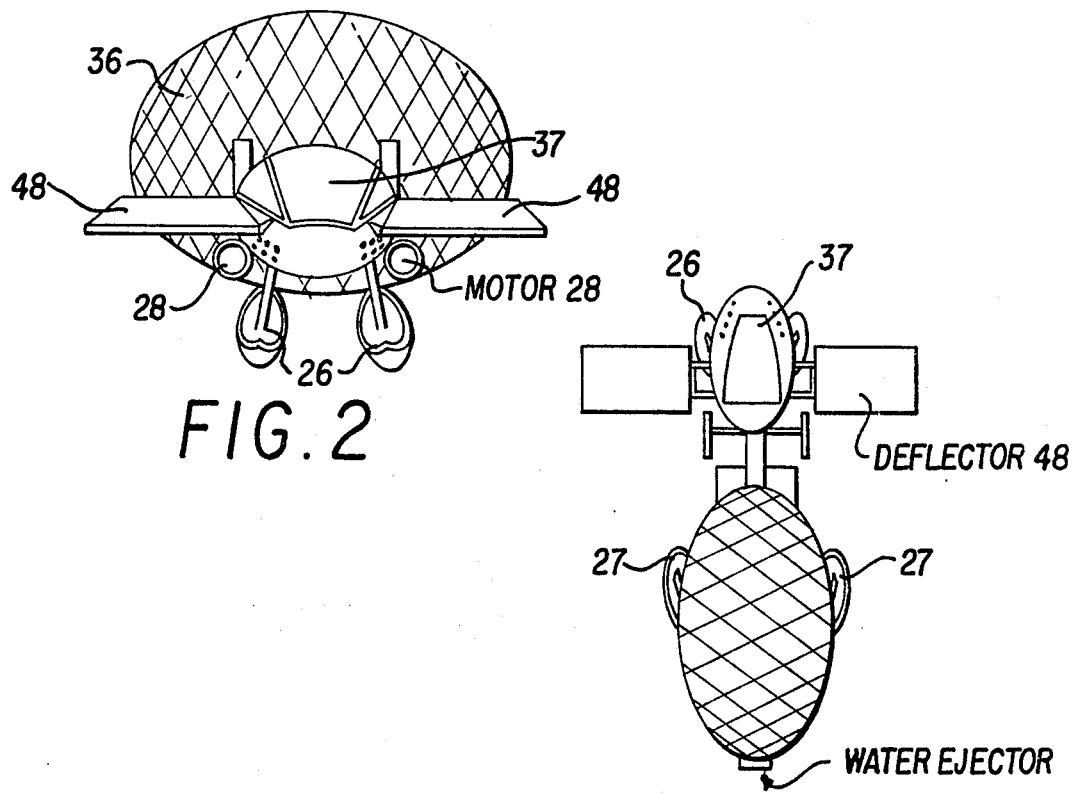

BALOPOD (HYBRID FLYING MACHINE)

Background of the Invention

1. Technical Field:

Lighter than air/Heavier than air technology. This is a class of flying machines made distinct by static lift (L.T.A.) and dynamic lift (H.T.A.). in a hybridology known as L.T.A.-H.T.A.

2. Background Art:

It seems, to date, not done and, yet desirable to start designing and producing an all-purpose vehicle-process capable of performing a multiplicity of functions . . . pleasure, design advance, shuttle (orbital and suborbital type), interplanetary (later) vehicle, alien planet (dense atmosphere) surveillance aircraft.

Such a vehicle, if accomplished, would have to display obvious advances over and differences from prior art (hopefully by incorporating as features: design versatility, applications versatility, low cost, and design simplicity).

If such a vehicle-process was tangibly able to glide backward it might (also, later) be usable as a car, ship, or submarine . . . by way of its' design compelled V.T.O.L.-S.T.O.L.- conventional manner (by coordinatedly manipulating lift, thrust, and balance).

High altitude technology, submersibles technology and ultra high speed would require special treatment. Swivelling-engines-technologies of L.T.A.-H.T.A., and L.T.A., H.T.A. are incorporable into newer designs. So, too, on-board-ballast extractors and ballast-shifting (more common to L.T.A.) are of value. Modifications such as (H.T.A.) airbrakes being usable as turnpanels are possible. . . being similar, in a sense, to vanes previously patented for airships and submarines. Historically, newer flying machines are tending toward high-thrust, pivotability, and ease of power adjustment (refined control), multiple- or combination- or alternate- power sources, and engines at various (front- or center- or tail-) locations.

L.T.A.: literature shows strengths (economy, range, general simplicity). Lighter-than-air weakness involve size, build-time, training-time, and hangering-time.

H.T.A.: literature shows strengths (speed, size). Weaknesses involve sink rate, expenses. . . of build, use, and design.

Problems inherent in L.T.A. and H.T.A. are solveable by balopod low cost, simplicity, utility, and versatility of design and use.

Prior patented L.T.A.-H.T.A. hybridology was unsuccessful because of such factors as frailty, complexity, costing and safety.

The center of gravity (before takeoff) of a balopod for purpose of product development, can be at 0.4 of the length (as with conventional H.T.A. vehicles). The Louis Airship Company in Ohio has stated willingness and ability (except for funds) to build a balopod.

Because balopod is a departure from conventional and varied Wright brothers (H.T.A.) one-point-life-(curved wing) thinking and from Montgolfier (L.T.A.) one-point-life-(round surface) thinking anf from hybrid one-point-lift thinking balopod has few examples of prior comparable art.

Two-point-lift-art examples are few in number (perhaps exclusively H.T.A.) . . . basically helicopters.

Terms such as "Airplaning", "ply" when coined (newly defined) or in common usage are readily understood. Proving the concepts (methods, etc.) of these terms is difficult except by actual operational use of the machines whereby these terms are applied.

H.T.A. wing aspect-ratio is 5:1 to 20:1. Balopod deflector ratios are 1:1 to 2:1 longitudinal.

Summary

A Balopod is a flying machine. It differs from a "blimp" because a Balo' is only half supported by hot gas. It differs from an "airplane" because a "Balo" has no wing. The deflector(s) is a main source of lift. . . supporting half of vehicle weight.

Generally speaking, there is a captive balloon at the rear and a deflector (variable angle) at the front. The balloon is allowed to lift the rear. A mounted pivotable (blower) thruster engine having 180 degrees swivel, exerts thrust. Atmosphere hits deflector forcing front up. By manipulating speed, deflector angle, weight distribution (operator controlled ballast-collection transfer) and weight (operator controlled ballast-collection by condensation of atmosphere) the vehicle flys forward, up, down. . . and should be capable of gliding backward and flying backward. Generally centrally located, mounted, vertically-hinged side turnpanels or parallel mounted thrust motors produce sideward motions (i.e. turns). The vertically hinged turn panels are optimally located depending on such factors as type aerostat, volume of aerostat, effective location in terms of (pilot controlled) coordinating of variables (engine-, deflector-, turnpanel-, etc.) forces. These turnpanels are bonded to the fuselage.

Verticular motion, as such, . . . or aeroplaning (engine blast aided), . . . or flight levelling may be accomplished by directing the engine' airblast upward or downward (thru 180 degrees of arc. . . at noon-6P.M. of a clock) in harmo with cooperative (operator controlled) "equipments". Basically, these other equipments are: pod, deflector, ballast, and turn-panels.

An object is to provide an aircraft with controls as described herein which can be operated from one or more central control panels.

Other and further objects and advantages of the present (system) invention will be apparent from the following detailed description, drawings and claim, the scope of the invention not being limited to the drawings themselves. . . as the drawings are only for the purpose of illustrating a way in which the principles of the invention can be applied.

Other embodiments of the invention utilizing same or equivalent principles may be used and structural changes (such as those between variants) may be made as desired by those skilled in the art without departing from the present invention and the purview of the appended claim.

This may be the first bonefide example of a 2-type-lift (separate and simultaneous with) 2-point-lift machine. . . being as an object, accomplished by static and dynamic lifts. . . seperetely and simultaneously. . . (by way of a L.T.A.-H.T.A. hybrid flying vehicle) exemplifying a new class of flying machines;

An object is "Airplaning". . . in the general sense of that term by deflector (#48). . . and, separately and simultaneoysly, tubular lift by gasbag (#36) . . being a 2-point-lift system generally different from prior art;

To accomplish the prior objects, the center-of-effective weight must be continually monitored, adjusted. This center of effective weight being: the average pressure/thrust point of the centers of gravity, buoyancy, lift, pressure, and thrust... being adjustable by onboard variables (static lift; deflector variables, engine variables, turnpanel variables; ballast).

A still further object is to allow the 2-point lift flight system to be made as art on a non-exclusive basis... except balopod.

The accompanying preferred embodiment and operating procedures detail the specific means for accomplishing these objects (objectives)... as the summary is directed toward the (disclosure as a whole... being commensurate with the) invention as claimed.

Brief Description of the Drawing(s)

Reference to...
Original drawings were done by the inventor.
Second stage drawings were done by Mr. Hal. J. Kaminsky (Professional sign painter at U.S.M.A., West Point, N.Y.).
Third stage drawings / Art Unit #315 at U.S. Patent Office.
FIGS. #1, 2, 3 External appearances (Side, Front, Top Views).
FIG. #4 Cutaway (Front Half).
FIG. #5 Cutaway (Back Half).
FIG. #6 Maneuver mechanism. (Deflector angle Control).
FIG. #7 External appearance(s) simplified.

DESCRIPTION OF THE PREFERRED EMBODIMENT(S)

Figure 4:
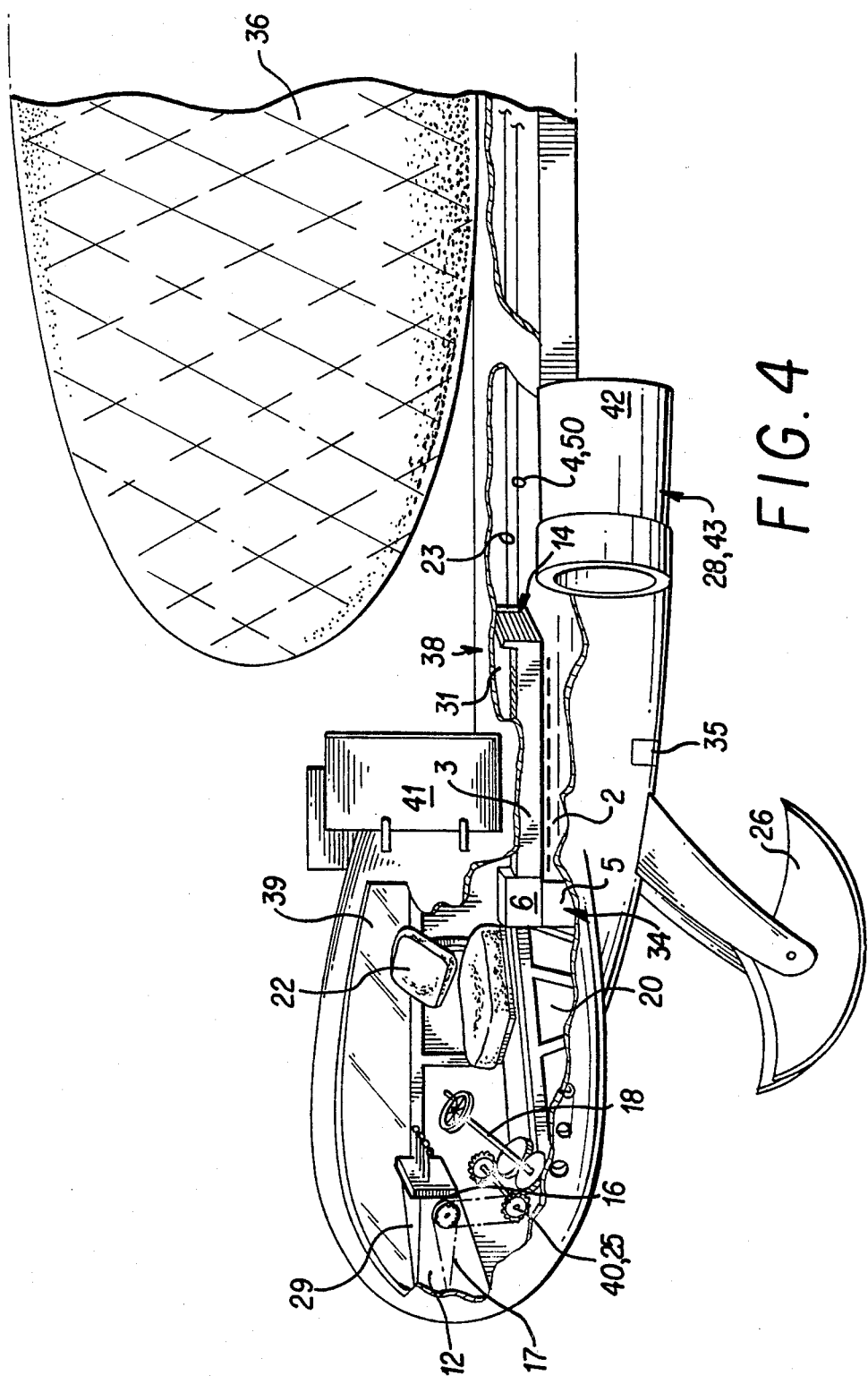
Figure 5:
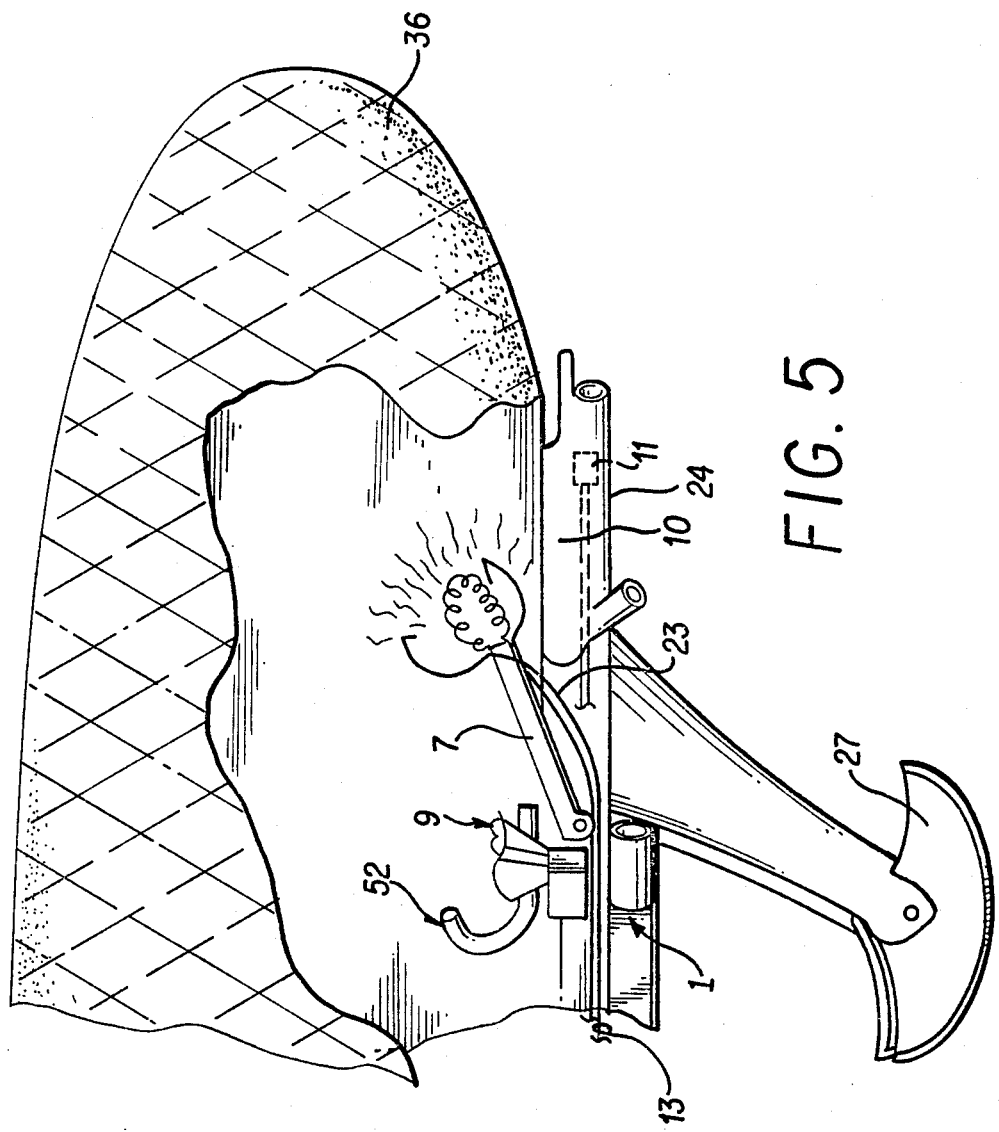
Figure 6:
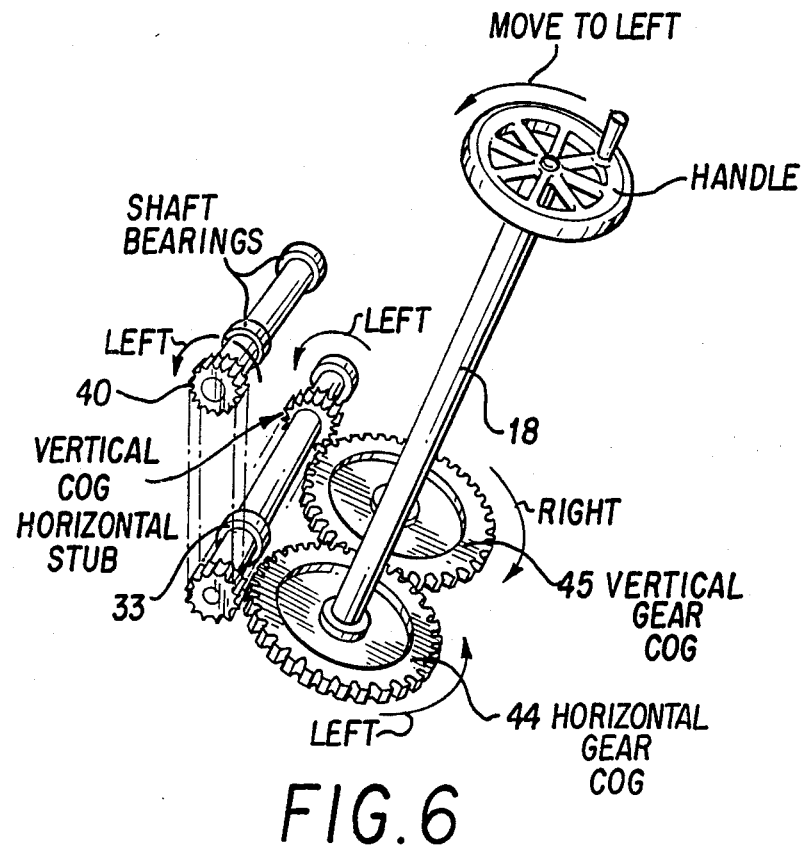
Figure 7A:
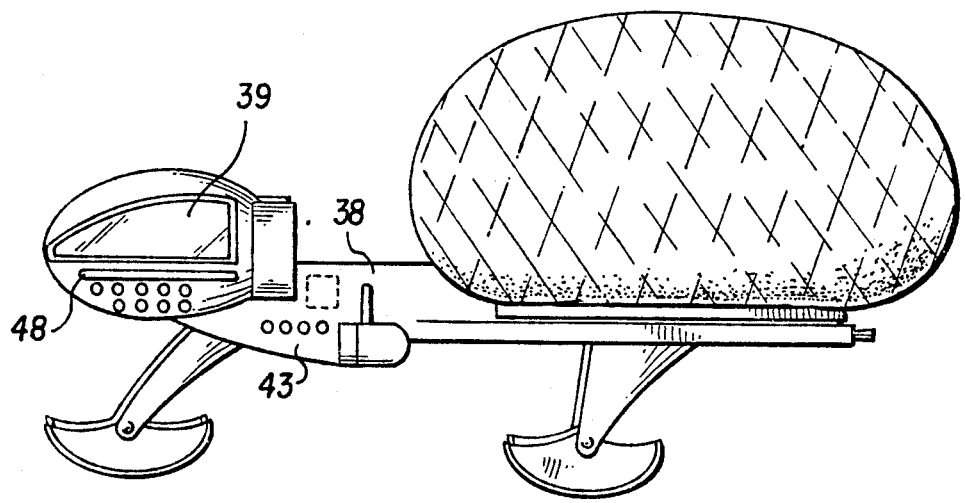
Figure 7B:
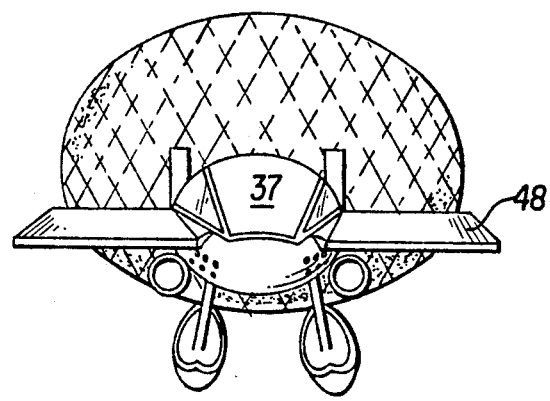

1. In order to secure half (total rear buoyancy) lift in this L.T.A.-H.T.A. hybrid vehicle, I have provided an elongated liftgas bag #36 secured to and adjacent, in terms of bag-function and advantageous orientations, atop the rear of fuselage #38... known as "integrate C". In order to secure half (total front) lift for the vehicle I have provided a flat, suitably strong, variable angle deflector #48 which when engaged properly allows (by "active or forced" aeroplaning) / supplies (from rotated-engine airblast) this half of the vehicles' total lift. Static lift is at the back ("segregate A") while dynamic lift is at the front ("segregate B").

The segregate-A (gasbag #36) is operated by controls #13, in the cockpit #37... as is segregate-B (deflector #48). Suitably mounted, verticaly hinged turnpanels #41 are operated by the pilot for left and right turns plus practical maneuvers... to operate separately or jointly (by affecting airflow) within turn-panel-mounts #57 being vertically hinged.

A suitable powerplant (any type) #1 optimally vertically-located, 180 degrees pivotable or not pivotable depending on type #1, optimally longitudinally (per function) located in terms of center of gravity, center of buoyancy, center of pressure, center of thrust and center of lift is mounted-facing-rearward to produce "jet-like" forward thrust... engaging dynamic lift action via deflector #48 for the forward-section-lift (segregate B). The gasbag (segregate A) #36 allows (pilot controlled) (heatable) static lift for ascent which, in operation, may be neutralized by operator controlled condensation-extracting (via #3) liquid from the atmosphere for use as a weightant... pumped by #30 selectively into storage tanks (located fore #2 and aft #10). If a pivotable engine #1 is used, the means for rotating such is supplied (for... appropriate pivot mounts, 180 degrees; with appropriate pivot mechanical system; and appropriate speed-of-rotation... to various angle settings).

Slide weights per balance-(minor) control are prospectively implied by L.T.A. art.

The deflector #48 angle is decreased during descent to lessen air deflection (per forward... segregate-B"lift"), in conjunction with pilot-operated coordinated airspeed per this maneuver.

Flight level in a sufficiently strong headwind (by/with thrust motor #1) producing near-zero thrust while simultaneously having a sufficiently low angle deflector #48 setting in conjunction withsuitable segregate-A weighdown per #10 could allow vertical landing. It remains to be seen whether the reverse could happen (i.e. whether in headwind there would be vertical ascent in a condition of near zero thrust, high deflector angle (#48), #1 blowing backward, with suitable weight lessening at #10 per pod). S.T.O.L. and V.T.O.L. operation is possible by virtue of the aspect ratio of the deflector #48 (1:1; 2:1)... when sufficient air is in force against the deflector at appropriate angle. The blower-motor #1 would have to be set at the rearward blowing and upward (or downward) blowing angles, respectively to do this. This is in keeping with current and past L.T.A. art and practice. When engine #1 is a swivel type, suitable swivel-assets (mounts, meters, mechanisma, methods) must be included in the device... (including distance to to the deflector).

As shown in L.T.A. literature, several shapes, types of liftgas-bags are possible, desirable per operation of L.T.A. vehicles. These include pseudo-shapes, -configurations. Pseudo shapes are also (altho less) common in H.T.A. aircraft (canard configurations, delta wing, flying wing, gyrocopters, etc.). Balopod combines L.T.A., H.T.A. principles into a workable 2-point-lift L.T.A.-H.T.A. vehicle... by conventional— (as illustrated) or pseudoshapes and—methods. This allows conventional (forward) flight and rearward glide. By way of mention, "pseudoshapes" means pseudo-pod, etc., ... and "pseudomethod" means swivel engines... common to L.T.A. art and practice (for vertical and rearward maneuvers). Such fueled pivotable thruster must contain, as a system, air passage ports where necessary, aerobatic carburetion, aircraft engines cooling assets and mounting. Volume, pressure, and temperature of the gasbag #36 must (as in all L.T.A. aerostats) be kept in balance.

Available:
360 degree pivoted engines, Sullivan, U.S. Pat. No. 2,926,869, 1960.
Extractor, Von Lude, U.S. Pat. No. 2,071,868, 1937.
Ballast shifting, Sperry, U.S. Pat. No. 1,818,104, 1931.

2. The 2-point-lift claimed for this L.T.A. hybrid is unique, ... accomplished by static lift per segregate-A (gasbag) #36 in harmony with appropriate (maneuver matching) operation of dynamic lift apparatus per segregate-B (deflector #48) thru the intermediate framework integrate-C (fuselage #38) via controls #13, cables #21, motors #1, axle #25, etc.

The 2 lifts are different (from each other), simple, separate and simultaneous... showing difference from and superiority vs. prior art (L.T.A., H.T.A., L.T.A.-H.T.A.). In balopods, each lift-element has its' own axis-of-lift (... each lift-point-center being the focus of a pressure system).

Because pivotable (180 degrees arc) engines are common to/in L.T.A. art and practice (allowing vertical vehicular movement, by/from engines directed upward or downward) their prospective incorporation into balopod is implied... allowing flight backward.

The "center of effective weight" (being the net-apparent weight-center in terms of averaging out the centers of lifts, ' buoyancy, ' pressure, ' gravity, and ' thrust) is the balancing center ("center of force") for ply. This is the focus of all force-variables... the focus of maneuvering.

Parts and subparts are operated/operate coordinatedly to affect/effect a "highly fluid" (mobile) focus of trim. In a sense, then, there are (mainly) 5 variables for 3 directions.

In balopod, as shown, liftgas release (i.e. gasbag volume control) is possible by conventional venting (#51) into atmosphere. There is a possibility of capturing (as per some L.T.A. airships) "unneeded" liftgas into an onboard vacuum(storage-)-chamber for reuse (per economy, efficiency, per temperature control, per descent aid via lesser size active volume, per pressure control, per lesser aerodynamic drag, etc.). As heat is applied (via #23... which, also supplies power for optional vacuum chamber #61), segregate #36 rises. As volume is increased, segregate #36 rises. Parameters of pod - pressure are available in L.T.A. literature.

In terms of the environment, medium to be traversed, operating procedures, (pilot) training, operator experience, pod conditions(regular and variable), deflector conditions (regular and variable), turnpanel conditions(regular and variable), engine conditions(regular and variable) and by adjusting ballast... the operator coordinates these interactions in favor of flight, flight-levelling, and airplanning(Aeroplanning).

Multiple: -pods, -engines, -turnpanels, -deflectors may under certain circumstances, be desirable.

Because of an aerostats (#36) advantage for half of total (Balo′) lift, range should be increased... and fuel consumption decreased... compared to H.T.A. aircraft. The vehicle is perhaps the first in history capable of a V.T.O.L.-S.T.O.L.-(L.T.A.-H.T.A.)hybrid-scramble via pusher engines.

Wheels, (#26, #27) as pictured, allows V.T.O.L., S.T.O.L. mud takeoff and landings. Wheel braking is not restricted to conventional method, if a better wheel(s) system is developed.

I consider the 2-point-lift system as being too important to be restricted by one-party(inventer) development. I desire that it be developed on a non-exclusive basis (excluding balopod).

Referring to figure #5 It will be seen that the aircraft of this invention comprises a cockpit #37 having skids or wheels #26, #27 which support the weight of it #37 and the weight of the pod arae #36 and the fuselage generally (#38).

The cockpit #37 would house pilots quarters including seat #22 best seen in FIG. #3. The seat is near control panel #13 and has suitable visibility thru #39.

In FIG. #5 is also shown the stub pivot #25 which is the means whereby an atmospheric-wind deflector is operated to support half of the vehicle. #41 is a set of turn-panels.

Referring again to FIG. #3, an engine #1 is mounted in a housing #42 which is open, if necessary, at its' forward end #43 for air intake to the engine.

(/ Scramble Emergency procedure)... at takeoff, there being almost no water in the reservoirs #2 front #10 aft... the back portion of the vehicle rises, engine #1, is turned on resulting in forward motion (or, alternatively, the turbogenerator (or surplus jet thrust) via tubes is engaged per vertical directioning of the front end) and with a preset angle (Sheet #5, FIG. #6) for deflector axle #25 by way of (stick shift) control #18 a S.T.O.L. front end lift is baically dynamically lifted. The turbo-generator (or jet if so desired) has ports, assets, tubes #60 appropriately situated (from the inside of vehicle to the outside of vehicle) to vent air selectively in favor of ply(s). Brake #53 locks #25. If desired, turbo-air ports may aid (if properly located) turns left and right or for "banking"/turns.

Angle of ascent can be deduced by reading inclination angle in degrees from indicator #12 (Sheet #2, FIG. #3).

Flight characteristics (Sheet #5, FIG. #6) are determined again by manipulation of control #18 (Sheet #2, FIG. #3) which operates (Sheet #5, FIG. #6) within housing #16 producing thru gears #44, #46 and shaft #47... because of sprocket #40... a chain-drive #17 on stub axle #25. Stub axle #25 is securely bonded to deflector #48 (Sheet #4, FIG. #5). Appropriate bearings and lubes necessary for such mechanical action are implied/inherent.

(Sheet #2, FIG. #3) in flight, battery #5 supplies D.C. electricity to control panel #13, by way of cable #21, which leads to control panel #13, by way of cable #21, which leads to control panel housing #29. Power is supplied by way of insulated tubing #23 to control #30 which manipulates water ejection from reservoir #2. Also (Sheet #3, FIG. #4) rearward power to operate control #11 which manipulates water ejection of rear reservoir #10 ... is supplied by tubing, power cable duct #23. Water ejects thru tube #4 (i.e. a connector per reservoirs #2, #10) rearward of pod.

The aircraft having as auxiliary equipment (Sheet #2, FIG. #3) a solar powered (taking advantage of aerostatic lifting capability) system #62, aiding power cable #23, or air driven turbo generator indicated at #31... suitably made secure by framing #45 is allowed or aided to accomplish S.T.O.L., V.T.O.L., Hover, Transit during reverse ply, and Airplaning.

Power from battery #5 or turbogenerator #31 can supply power need of heater-blower combination; In other words, the turbogenerator can induce high velocity air, compressed air, or/and electricity.

Referring to FIG. #1, in-flight, turns can be accomplished from control panel #13, by suitable cabling to outboard hinges of outboard turn panels #41. This apparatus can be shaped to operate these turn-panels singly or simultaneously. An operational option is to use these turnpanels as dive-brakes... jointly carefully.

During flight, if descent is desired, (Sheet #2, FIG. #3) air inlet #15 suitably threaded for fine adjustment, if necessary, is opened by manual control #1. The air thereby allowed into extractor #3 is treated to produce water (as ballast; weightant) which drops into reservoir #2. Still referring to FIG. #3, there is a water line #50 from extractor #3 to back reservoir #10. The pipeline is unseen in this view, runs parallel to line #14, and the water pump (also unseen) can be powered by the turbo generator #31 or by battery #5 as desired. The turbogenerator, of course, has all of the necessary mounts, thrust tubes, and assets necessary for its' 8 functions .. . air, electric, and 6 "plys". Note, also, that water pumped in and out of reservoirs can be done by each reservoir having a dual-purpose pump. Treated air leaves thru ports #14.

(Sheets #2, FIG. #3) symbols #34, #35 refers to a manual (forward reservoir) water-release thru a tube which extends backward past the engine. The significance of this is that... if pumpout of tank #2 fails during dive... water can be released (vacuum drawout), lessening weight, increasing chance of level flight' safer) recovery; Failure of the tank #2 pump during ascent, similarly, by manually releasing the weightant would expedite nose-up ascent rate. If reservoirs were longitudinally divided, selectively releasing water in 1 side could aid banking during turns.

Referring to (Sheet #3, FIG. #4), at the integrate-segregate (i.e. at Segr. A), note that symbol #1 refers to thrust engine(s) and that water can leave vehicle thru tube #4 from both reservoirs #2 and #10. Part #11 is the electromechanical device which operated orifice emptying tank #10. The pod periphery is well secured, insulated and composed of appropriate materials. The gasbag #36 must be able to withstand extremes of volume, pressure, temperature within design limits of the vehicle. A closed aerostat is illustrated.

Power delivered from battery #5 or turbogenerator can supply (Sheet #3, FIG. #4) need of heater-fan #7, control #11 by way of power cable #23. The flange (inner) #8 and matching locking ring #9 must produce a gastight seal. Note that thru' (gas-reverse) tube #51 gas(s) was initially inserted and, then, shut off by seal or valve #52. Before or after flight ... a gauge could be screwed onto site #52 to readout internal pod conditions ... this being an adjunct to suitable in-flight control panel readings. Power can be tapped from cable #23 for this purpose. Power from cable #23 can supply power necessary for optional vacuum chamber #61 ... such power being derived from the system of optional solar panels. Solar panels, as an electric source, presently need a large surface area... which aerostat #36 can supply for (volume control) vacuum chamber #61.

Note that aloft, with power shutoff this vehicle can glide backward ("ply right") by means of raising the trailing edge of the deflector. Fine control of the waterweight in tank #10 would help this maneuver.

From the foregoing description, it is thought to be obvious that a Balopod aircraft constructed in accordance with my invention is particularly well adapted for use, by reason of the convenience and facility with which it may be assembled and operated, and it will be further obvious that my invention is susceptible of some change and modifications without departing from the principles and spirit thereof, and for this reason I do not wish to be understood as limiting myself to the precise arrangements and formation of the several parts herein shown in carrying out the invention in practice, except as claimed;

Method Steps:
  Forward Flight...
    1. Static lift per back (Pod #36).
    2. Thrust (#1) forward.
    3. Dynamic lift per front (via #48 deflector system).
    4. Balance.
  Backward Flight...
    1. Static lift per back (Pod #36).
    2. Thrust (#1) backward.
    3. Dynamic lift per front (via #48 deflector system).
    4. Balance.
  Vertical Flight...
    1. Static lift per back (Pod #36).
    2. Thrust upward via engine swivel ... i. e. or jet downward from turbogenerator).
    3. Balance.
  Hover...
    1. Static lift per back (Pod #36).
    2. Thrust upward to balance gasbag at aerostation.
    3. Ballast for minor flight levelling.
  Transit for ply reversal...
    1. Ply regular.
    2. Swivel engine until reversal of ply complete. This is done at a lower airspeed while raising trailing edge of deflector.
  New parts per Balopod:
    A. (Reliable) vacuum chamber system.
    B. (Rapid-response) reliable deflector system.

I claim:

1. A hybrid aircraft including both static lift (lighter than air) and dynamic lift (heavier than air) means; said aircraft comprising a rigid frame connecting said static lift means and said dynamic lift means and extending from the front end to the rear end of said aircraft, a cockpit rigidly secured to the front of said frame containing pilot control means, vertically hinged turn panels attached to the rear of the cockpit and controlled by said control means to provide yaw control to said aircraft, jet engines mounted upon horizontal pivot axes attached to the front half of said rigid frame and controlled by said control means to tbe pivoted through 180° to provide both horizontal and vertical thrust to said aircraft, said static lift means comprises a lighter than air gas bag attached to the rear portion of said frame and provided with means to vary the buoyancy thereof; said dynamic lift means comprises pivoted deflectors mounted upon horizontal axes attached directly to said cockpit and the angle of the deflection thereof controlled by said control means; said aircraft further comprising ballast making means and ballast storage tanks located in the front and rear of said aircraft with shifting means to shift ballast from said front tank to said rear tank to balance the aircraft; whereby said dynamic lift means is solely located on the front of said frame and provided a lifting force to the front of said aircraft and said static lift means is solely located on the rear of said frame and provides a lifting force to the rear of said aircraft and the control means is used to control said lifting forces and said jet engines and thereby control the attitude and flight direction of said aircraft.

* * * * *